United States Patent [19]

Skold

[11] 4,385,011

[45] May 24, 1983

[54] SLOPED FILM FILL ASSEMBLY

[75] Inventor: Jan O. Skold, Fort Myers, Fla.

[73] Assignee: Munters Corporation, Fort Myers, Fla.

[21] Appl. No.: 302,149

[22] Filed: Sep. 14, 1981

Related U.S. Application Data

[63] Continuation of Ser. No. 139,689, Apr. 14, 1980, abandoned.

[51] Int. Cl.³ .............................................. B01F 3/04
[52] U.S. Cl. ............................. 261/112; 261/DIG. 11
[58] Field of Search ........................ 428/175, 182–186; 261/112, DIG. 11, DIG. 77, 110; 165/DIG. 1

[56] References Cited

U.S. PATENT DOCUMENTS

| | | | |
|---|---|---|---|
| 2,661,197 | 12/1953 | Norman | 261/112 |
| 3,450,393 | 6/1969 | Munters | 261/112 |
| 3,628,776 | 12/1971 | Raseley | 261/DIG. 11 |
| 3,738,626 | 6/1973 | Norback | 261/112 |
| 3,917,764 | 11/1975 | Phelps | 261/DIG. 11 |
| 4,202,847 | 5/1980 | Ernst et al. | 261/112 |

FOREIGN PATENT DOCUMENTS 413159 8/1910 France .................... 261/112

Primary Examiner—Tim R. Miles
Attorney, Agent, or Firm—Curtis, Morris & Safford

[57] ABSTRACT

An improved liquid gas contact tower of the type having film fill placed in the tower with its principal plane inclined at an angle to the vertical so as to intersect a gas path extending between gas inlet and outlet openings includes a plurality of dewatering sheets secured to the film fill adjacent its lower surface to intercept liquid collecting and flowing along the film fill sheets and deflect it away from the fill, thereby to decrease the air pressure drop through the film fill during use.

7 Claims, 7 Drawing Figures

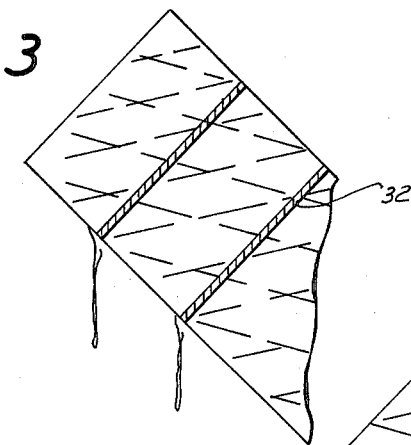
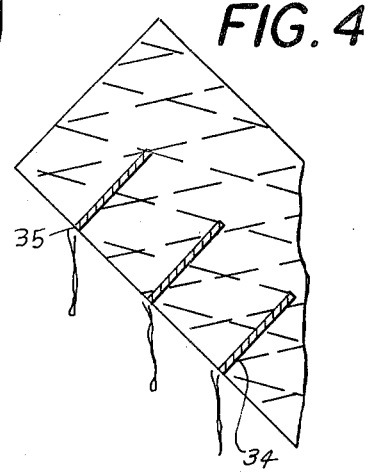
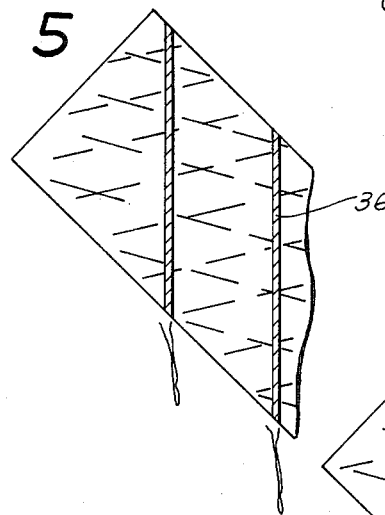
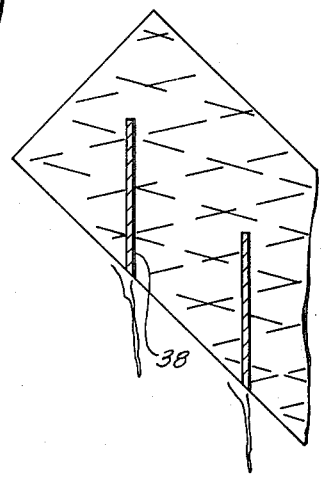
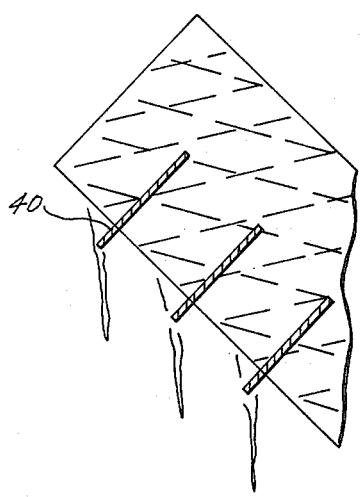

SLOPED FILM FILL ASSEMBLY

This is a continuation of application Ser. No. 139,689 filed Apr. 14, 1980, now abandoned.

The present invention relates to sloped film fill cooling towers, and in particular, to cooling towers of the type described in U.S. Pat. No. 3,917,764.

Sloped film fill assembly towers of the type described in U.S. Pat. No. 3,917,764 to Phelps, were developed to provide a tower that has an increased water load capacity. Additionally, such towers provide for some reduction in the fan power requirements needed to draw cooling air through the fill material.

U.S. Pat. No. 3,917,764, the disclosure of which is incorporated herein by reference, illustrates a number of different types of sloped film fill cooling tower assemblies. It has been found that the performance of such cooling towers can be materially improved by providing the film fill material with dewatering sheets or strips mounted on the lower edge of the fill. These dewatering sheets intercept liquid flowing through the fill along its lower edge, and deflect the liquid downwardly so that it falls into the bottom of the tower. Removal of the liquid from the fill in this manner opens up the air passages in the fill to a greater extent and reduces the air pressure drop across the fill. As a result, improved water load capacities are achieved and/or there is a reduction in fan power requirements.

In sloped film fill cooling towers the liquid distributed to the upper surface of the fill material tends to gravitate downwardly along the fill sheets. However, because of the contact of the liquid with the sheets of the sloping fill, and due to the displacement force of the air passing between the fill sheets the liquid does not flow directly vertically down through the fill and out the bottom but will also be displaced horizontally along the sheets of the inclined fill. As a result, there is a tendency for liquid to build up within the passages of the fill material, causing restrictions between the fill sheets. Also because of the surface tension the liquid tends to adhere to and flow along the lower edge of the film sheets, thereby causing a buildup of liquid at the bottom of the fill and further restriction to the air at this point. The dewatering sheets of the present invention intercept this collecting water and deflect it vertically downwardly out of the fill so that the air passages in the fill remain unrestricted.

Accordingly, it is an object of the present invention to provide an improved liquid-gas contact tower having reduced air pressure drop across the fill.

The above, and other objects, features and advantges of this invention will be apparent in the following detailed description of an illustrative embodiment thereof, which is to be read in connection with the accompanying drawings, wherein:

FIGS. 3-7 are enlarged views, similar to FIG. 2 of other configurations of dewatering sheets used in the film fill material of the liquid-gas contact tower.

Figure 1:
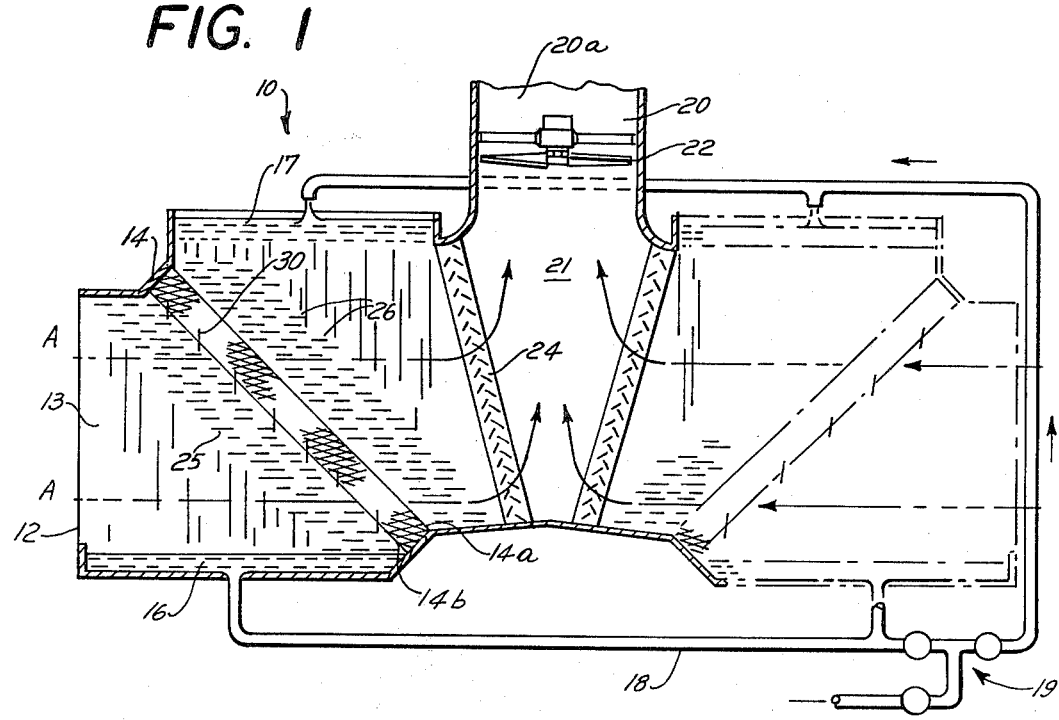
FIG. 1 is an elevational view, in section, showing a gas-liquid contact tower containing sloped film fill having dewatering sheets in accordance with the present invention.

Referring now to the drawings in detail, and initially to FIG. 1 thereof, a cooling tower 10 is illustrated which corresponds to one of the cooling towers illustrated in U.S. Pat. No. 3,917,764, but which contains a film fill having dewatering sheets secured thereto in accordance with the present invention. For simplicity, only the left portion of the drawing is shown in detail and will be described.

Cooling towers 10 includes an end wall 12 having a gas inlet opening 13 formed therein extending along a major portion of that end wall. A film type fill assembly 14 is mounted in the cooling tower by brackets or the like, in any convenient manner. The fill assembly has a principal plane which is inclined at a substantial angle to both the vertical and horizontal. As shown in FIG. 1, the fill is mounted at a 45° angle. However, in accordance with the teachings of U.S. Pat. No. 3,917,764, this angle may be varied between twenty and seventy degrees depending upon the type of functional characteristics required for the tower.

The material used to form the fill may be any of the materials shown in U.S. Pat. No. 3,917,764 although the cross-fluted corrugated fill, i.e. the so-called "Munters fill", is preferred.

The entire film fill assembly is generally rectangular and has an upper surface 14a which is in communication with a source of liquid. The lower surface 14b of the fill is in communication with a major portion of the gas entering the inlet opening 13.

The base of the cooling tower includes a basin 16 disposed below the fill assembly 14 to receive liquid gravitating or falling from the fill.

The upper end of the cooling tower includes a perforated pan or tray 17 positioned above the fill assembly 14 which allows water to gravitate through apertures in the tray onto the upper surface 14a of the fill.

In the conventional manner, a pumping arrangement is provided for removing liquid from the basin 16 through line 18 and supplying it to a heat exchanger for cooling before being returned to the distributing trays 17.

In this embodiment of the invention the cooling tower 10 includes a vertical stack 20 secured to the top face of the tower and extending upwardly from a central plenum chamber 21 to define an upper outlet opening 20a for gas exiting therefrom. A fan 22 is located within the stack to cause gas or air to be drawn through the fill 14 along the path A before being discharged through the stack 20. If desired a drift eliminator wall 24 may be disposed across the path of air exiting from the fill material to prevent gravitating water from being carried away as spray into the plenum chamber 21.

In addition, if desired, optional cross flow splash type fill, such as generally horizontal slats 25 may be disposed in the area of the tower between the fill 14 and the gas inlet opening to redistribute water gravitating from the fill. Likewise, splash type fill 26 may be located above the fill 14 to intercept water gravitating from the pan 17 before contacting the upper surface of assembly 14.

As thus far described, cooling tower 10 is substantially identical to that described in U.S. Pat. No. 3,917,764. The functional characteristics of the tower, however, are improved in accordance with the present invention wherein dewatering sheets 30 are inserted in the surface 14b of the film fill assembly 14.

Figure 2:
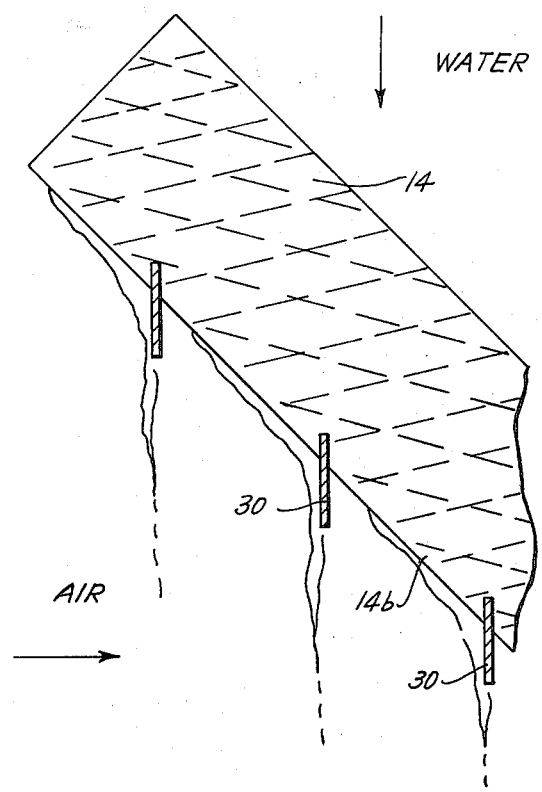
FIG. 2 is an enlarged view of the film fill shown in FIG. 1.

As seen in FIG. 2, the water distributing sheets 30 are secured to the lower edge 14b of the film fill in spaced locations to each other. The dewatering sheets penetrate the lower edges of the sheet material used to form the fill 14, across substantially the entire width of the contact body, and are secured in slots cut in the edges of the fill, by a friction fit, or by a suitable adhesive. The dewatering strips 30 are relatively flat and extend transversely to the sheets used to form the fill. They may be formed of the same material as the film fill sheets or they may be formed as metal, e.g. stainless steel strips.

As mentioned, water or other liquid passing through the fill 14 tends to gravitate downwardly, but additionally tends to gravitate laterally (i.e. horizontally) along the sheets of the fill. As this water collects and gravitates along its angular path, it tends to fill the passages in the fill material. In addition, the liquid tends to adhere to and flow along the lower edge of the film sheet because of its surface tension, thereby causing a buildup of liquid at the bottom of the fill and further restriction to air flow at this point. As a result of the restriction in the passages a greater pressure drop is created across the fill material. This increased pressure drop cuts down the thermal efficiency of the tower, and increases the required fan power to draw air through the fill. The dewatering strips used according to the present invention intercept this collecting liquid within the fill material, particularly along its lower edges, and deflects the liquid away from the fill's lower edges to the basin 16. This opens up the passages in the fill and reduces the pressure drop thereacross.

In the embodiment of the invention illustrated in FIG. 2, the dewatering sheets 30 penetrate only a small distance into the lower edges of the sheets forming the film fill material, and extend in a generally vertical direction beyond the lower edge of the sheet. However, it is contemplated that other positioning of the dewatering sheets may be used in particular situations depending upon the type of functional characteristics required for the tower. Thus, for example, as illustrated in FIG. 3, the dewatering strips 32 are positioned to extend entirely through the height of the fill material, and to lie within the planes of the upper and lower surfaces of the fill. Likewise, in the embodiment of FIG. 4, the dewatering strips 34 are shown as penetrating the fill to a predetermined height, but with its lower edge 35 lying in the same plane as the lower surface 14b of the fill pack. In both of the embodiments of FIGS. 3 and 4, the dewatering strips extend perpendicularly to the lower face of the fill material, so that they reside at an angle to the vertical. That angle will be the complement of the angle at which the fill pack 14 resides to the vertical.

In the embodiments of FIGS. 5 and 6, the dewatering sheets 36, 38 are positioned to extend in the vertical direction, in the same manner as the dewatering sheets 30 of FIG. 2. In these embodiments, the dewatering sheets do not extend beyond the lower surface 14b of the fill pack. In the embodiment of FIG. 7, the dewatering sheet 40 is shown extending beyond the fill pack, with the dewatering sheets being mounted perpendicularly to the lower face of the fill material.

The bottom edges of the dewatering sheets may be straight, or they may be provided in a configuration which may improve their dewatering effect. One such configuration would be a serrated edge extending along the length of the dewatering sheets.

Further improved drainage can be achieved by using a fill film material of the type shown in U.S. Pat. No. 3,738,626 which includes integral drainage means on the lower edges of the sheets of the fill itself. That patent discloses a fill in which selected sheets are longer than intermediate cross fluted sheets. Using this type of fill with a transverse dewatering strip 38 of the present invention will achieve further improved results.

In each of these embodiments of the invention, the dewatering sheets will intercept the liquid which tends to collect in the passages or channels between the fill sheets, particularly along the lower edges of this fill due to the surface tension of the liquid, and deflect that water or liquid downwardly into the basin of the cooling tower, thereby reducing the air pressure drop across the fill material and improving thermal efficiency of the tower. This is a particularly important advantage in the replacement of fill in existing cooling towers. In such retro-fitting operations the reduced capacity of a worn fan, or the desire for an increased cooling capacity, makes the requirement for an extremely low pressure drop across the fill material very important. By using the present invention the capacity of the tower can be increased, or improved, without other major changes in the fan capacity or structure of the tower itself.

Although illustrative embodiments of the invention have been described herein with reference to the accompanying drawings, it is to be understood that the invention is not limited to those precise embodiments, and that various changes and modifications may be effected therein by one skilled in the art without departing from the scope or spirit of this invention.

What is claimed is:

1. In a liquid-gas contact tower having at least one upright side wall with a gas inlet opening therein, means for supplying gravitating liquid to the upper portion of the tower, gas outlet opening, film fill means mounted in said tower having opposed upper and lower surfaces, said film fill means having a principal plane inclined at an angle of between about 20° and 70° to the vertical and also disposed to intersect a gas path extending between said gas inlet and outlet openings, said upper surface being disposed below said liquid supply means to intersect liquid gravitating therefrom, said lower surface being in communication with said gas inlet opening and said upper surface being in communication with said gas outlet opening, said film fill means comprising a plurality of sheets of cross-fluted corrugated fill mounted so that adjacent sheets define flow passages which allow for the passage of gas along said path and of liquid gravitating from said liquid supply means and said sheets having lower edges defining said lower surface of the film fill means, said sheets being positioned such that said passages extend at an angle to the vertical, the improvement comprising a plurality of dewatering sheets secured in the lower edges of the sheets of said film fill means at least at said lower surface thereof and extending transversely of said film fill sheets to intercept liquid collecting and flowing under the influence of gravity along the inclined lower surface of said film fill sheets adjacent said lower edges of the sheets of the film fill means and clogging said passages; said dewatering sheets causing the water flowing along said lower edges of the sheets to fall from the film fill means thereby to decrease air pressure drop through said film fill means; said dewatering sheets extending into said film fill sheets for a predetermined depth of penetration along said lower edges.

2. In a liquid-gas contact tower as defined in claim 1, wherein said dewatering sheets are mounted to extend vertically.

3. In a liquid-gas contact tower as defined in claim 1, wherein said dewatering sheets are mounted to extend at an angle to the vertical direction which is not greater than the angle of inclination of the film fill means to the horizontal.

4. In a liquid-gas contact tower as defined in claim 1, wherein said dewatering sheets are mounted to extend perpendicularly to said film fill sheets.

5. In a liquid-gas contact tower as defined in any one of claims 1, 2, 3, or 4, wherein said dewatering sheets have lower edges which lie in the same plane as the lower surface of said film fill means.

6. In a liquid-gas contact tower as defined in any one of claims 1, 2, 3 or 4, wherein said dewatering sheets have lower edges which extend beyond the lower surface of said film fill means.

7. In a liquid-gas contact tower as defined in any one of claims 1, 2, 3 or 4, wherein said dewatering sheets have lower edges which are straight.

* * * * *